(12) United States Patent
Lepsch et al.

(10) Patent No.: US 11,053,901 B2
(45) Date of Patent: Jul. 6, 2021

(54) METHOD OF PREHEATING AND CONTROLLING THE TEMPERATURE OF FUEL INJECTED INTO A COMBUSTION ENGINE

(71) Applicant: ROBERT BOSCH LIMITADA, Campinas (BR)

(72) Inventors: Fernando Lepsch, Campinas (BR); Fernando de Oliveira, Jr., Campinas (BR); Marcello Francisco Brunocilla, Indaiatuba (BR)

(73) Assignee: ROBERT BOSCH LIMITADA, Campinas-SP (BR)

( * ) Notice: Subject to any disclaimer, the term of this patent is extended or adjusted under 35 U.S.C. 154(b) by 0 days.

(21) Appl. No.: 16/690,513

(22) Filed: Nov. 21, 2019

(65) Prior Publication Data

US 2020/0208595 A1    Jul. 2, 2020

(30) Foreign Application Priority Data

Dec. 26, 2018    (BR) .................... 102018077092-6

(51) Int. Cl.
*F02M 53/02*   (2006.01)
*F02D 41/06*   (2006.01)

(52) U.S. Cl.
CPC ........... *F02M 53/02* (2013.01); *F02D 41/062* (2013.01); *F02D 2200/0606* (2013.01)

(58) Field of Classification Search
CPC .... F02D 41/06; F02D 41/062; F02D 41/3005; F02D 2200/0606; F02M 53/02; F02M 53/04
See application file for complete search history.

(56) References Cited

U.S. PATENT DOCUMENTS

| 5,357,927 | A | * | 10/1994 | Saito | ................... F02D 19/0686 |
| | | | | | 123/406.54 |
| 8,006,671 | B2 | * | 8/2011 | Maeda | .................. F02D 41/345 |
| | | | | | 123/491 |
| 8,881,530 | B2 | * | 11/2014 | Gulen | ..................... F01K 3/16 |
| | | | | | 60/736 |
| 8,936,010 | B2 | | 1/2015 | Costa et al. | |
| 9,638,152 | B2 | | 5/2017 | Zorzetto et al. | |
| 2013/0306029 | A1 | * | 11/2013 | Stockner | ............ F02M 21/0245 |
| | | | | | 123/445 |

(Continued)

FOREIGN PATENT DOCUMENTS

| BR | PI0902488 | 4/2010 |
| WO | 2017221036 | 12/2017 |

OTHER PUBLICATIONS

JP 2010-038024 English Translation Version.*

(Continued)

*Primary Examiner* — John Kwon
*Assistant Examiner* — Johnny H Hoang
(74) *Attorney, Agent, or Firm* — Michael Best & Friedrich LLP

(57) ABSTRACT

Method of preheating and controlling the temperature of fuel injected into a combustion engine to enable a reduction in the amount of fuel injected into engines which may be powered both by pure gasoline and by ethanol or any biofuel mixture, where the engine is located in environments with low temperatures and extremely cold temperatures.

6 Claims, 3 Drawing Sheets

(56) References Cited

U.S. PATENT DOCUMENTS

2015/0090230 A1\* 4/2015 Bolz .................. F02D 41/0085
                                                                              123/480
2019/0195162 A1\* 6/2019 Stronati ............... F02D 41/047

OTHER PUBLICATIONS

United States Patent Office Non Final Office Action for U.S. Appl. No. 16/690,677 dated Sep. 17, 2020 (10 pages).
United States Patent Office Action for U.S. Appl. No. 16/690,677 dated Mar. 29, 2021 (8 pages).

\* cited by examiner

METHOD OF PREHEATING AND CONTROLLING THE TEMPERATURE OF FUEL INJECTED INTO A COMBUSTION ENGINE

BACKGROUND OF THE INVENTION

This invention concerns a method for preheating and controlling the temperature of fuel injected into a combustion engine that allows for a reduction in the amount of fuel injected into engines that may be powered both by pure gasoline and by ethanol or any bi-fuel mixture, located in environments with low temperatures and extremely cold temperatures, including below 0° C.

In recent years, problems concerning the amounts of pollutants emitted (HC, CO, $CO_2$ and particulates), principally by car engines, have been a major problem for large cities. As a result, new technologies have been developed to help in the reduction of pollutants emitted by internal combustion engines.

When we talk about engines that use the Otto cycle (engines that can be powered both by pure gasoline and ethanol or any bi-fuel mixture), both those that use Port Fuel Injection (PFI) and those that operate with Direct Injection (DI) emit particulates above the permitted limits. As a result, the use of a particle filter for gasoline engines (whose acronym is GPF, from the English Gasoline Particulate Filter) has been recommended to comply with new particulate emissions laws that have come into force.

However, even with the use of GPF, engines can still generate particulates above the limits determined by the official health agencies, since emissions of pollutants also depend on drivers' conduct, regarding how they drive and the adequate maintenance of their vehicles.

In addition to this, the condensation of fuel in cold areas of the engine can result in incomplete combustion, generating hydrocarbons and carbon monoxide (HC and CO).

Some solutions to this type of problem are already known, such as the solution described in patent document PI 0902488-3. This document describes a fuel heater arranged in the internal combustion engine. In addition to this, this document describes a device for determining fuel temperature and pressure, adjusting the target fuel temperature in accordance with the fuel pressure detected by a pressure sensor and a fuel temperature control device that controls the fuel heater, in order to adjust the temperature detected by a sensor to the target temperature of the fuel.

However, in the invention described in this patent document it is mandatory to use a fuel pressure sensor, causing the target temperature to be adjusted according to the fuel pressure measured. Moreover, it is not necessary to know the upstream temperature of the heater, which makes the calculation of the power necessary to heat the fuel less accurate, thus not satisfactorily achieving the reduction in pollutants.

Another technique related to this problem is described in patent document WO2017/221036. Generally speaking, this invention describes a vehicle that reduced fuel injection volumes due to the heating of fuel. In more detail, this document describes a vehicle with an internal combustion engine equipped with at least one heater to heat the fuel before it is delivered to the cylinder by the fuel injector; a fuel pump connected to the heater to provide fuel to the heater, and a controller of the engine torque and the fuel pressure generated by the pump, where the engine controller uses a heated fuel behavior model of the engine when the fuel is being heated by the heater, to control the amount of fuel supplied by the fuel injector, in order to reduce the amount of fuel injection for a given engine torque in relation to the unheated fuel; and to cause greater fuel pressure to be generated by the fuel pump in relation to the unheated fuel.

The technique revealed in patent document WO2017/221036 describes a system where controlling the amount of fuel injected into the engine and increasing fuel pressure is achieved based on a heated fuel model in relation to the unheated model. In other words, it employs a highly complicated logic, which uses two injection control models.

SUMMARY OF THE INVENTION

So, the present invention proposes to solve the problems of the state of the art in a much more simplified and efficient manner with applications in environments with extremely cold temperatures, including below 0° C.

In order to solve the technical problem presented and overcome the disadvantages of the documents described in the state of the art, and allow for a reduction in pollutants when the engine is located in environments with extremely low temperatures, this invention seeks to provide a simple and efficient method of preheating and controlling the temperature of the fuel injected into combustion engines, which comprises:

an electronic fuel injection control unit in the engine, at least one fuel-heating device arranged in contact with the fuel, at least one fuel-heating control unit 6 connected by means of at least one data connection to the electronic injection control unit, and electrically connected to at least one fuel-heater, where the fuel-heating control unit controls the operation of at least one fuel heater;

where the said method, and object of the present invention, comprises the steps of:

turning on the heating system;

measuring an initial temperature of the upstream fuel $t_{inc}$ of the heater 3;

measuring an ambient temperature $t_{amb}$;

reading a target temperature of the pre-heated fuel $t_{pre}$ downstream of the heater;

comparing the initial temperature of the fuel $t_{inc}$ upstream of the heater and the target temperature $t_{pre}$ of the pre-heated fuel;

calculating a preheating power $p_{pre}$ necessary to be applied in the heater 3;

applying a preheating power $p_{pre}$ calculated in the heater 3 controlled by the heating control unit;

comparing the temperature of the fuel $t_c$ downstream of the heater with the target temperature $t_{pre}$ of the pre-heated fuel;

enabling the startup of the engine 8 when the fuel temperature condition $t_c$ is greater than or equal to the target temperature of the preheated fuel $t_{pre}$;

measuring a temperature of the fuel $t_c$ downstream of the heater 3;

reading a target temperature of the fuel $t_a$ downstream of the previously cited heater 3;

comparing the temperature of the fuel $t_c$ downstream of the heater with the target temperature $t_a$ downstream of the heater;

calculating a power $p_{aq}$ necessary to be used in the heater 3;

applying a power $P_{aq}$ calculated in the heater 3 controlled by the heating control unit 6.

DETAILED DESCRIPTION

The fuel heating and heating management system is responsible for heating the fuel that will be injected into the engine up to a predetermined temperature. The heating of the fuel is intended to improve the atomization of the spray of the injected fuel, reducing its drop size, which results in improved preparation of the air-fuel mixture, leading to a more homogeneous mixture, which will result in a decrease in the amount of fuel injected, thus decreasing the quantity of gases and particulates emitted.

Figure 2:
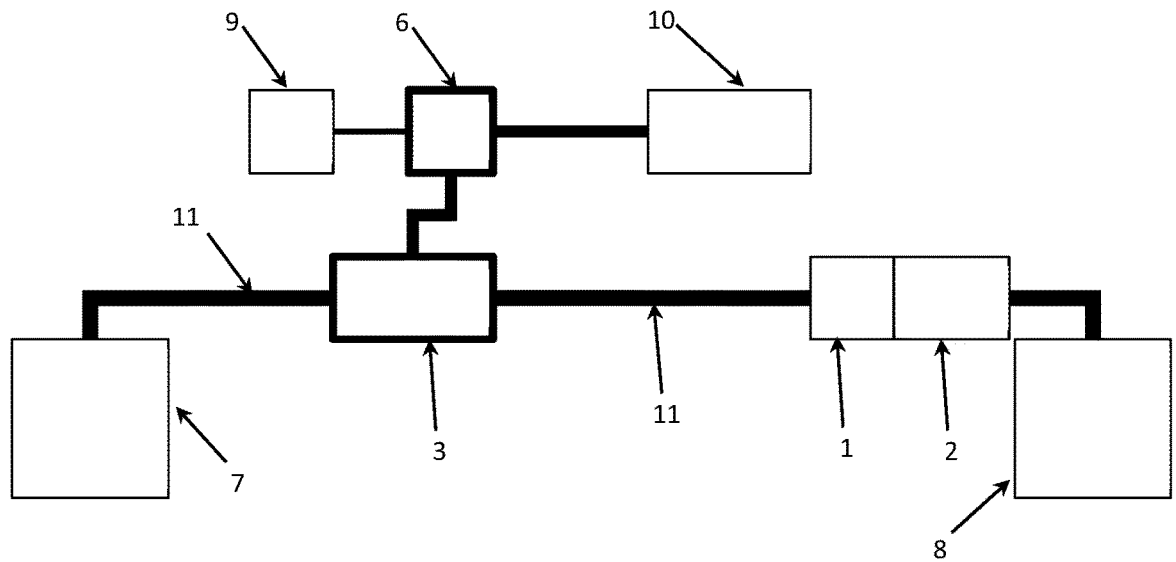
FIG. 2—Schematic of a first embodiment of the heating system.
Figure 3:
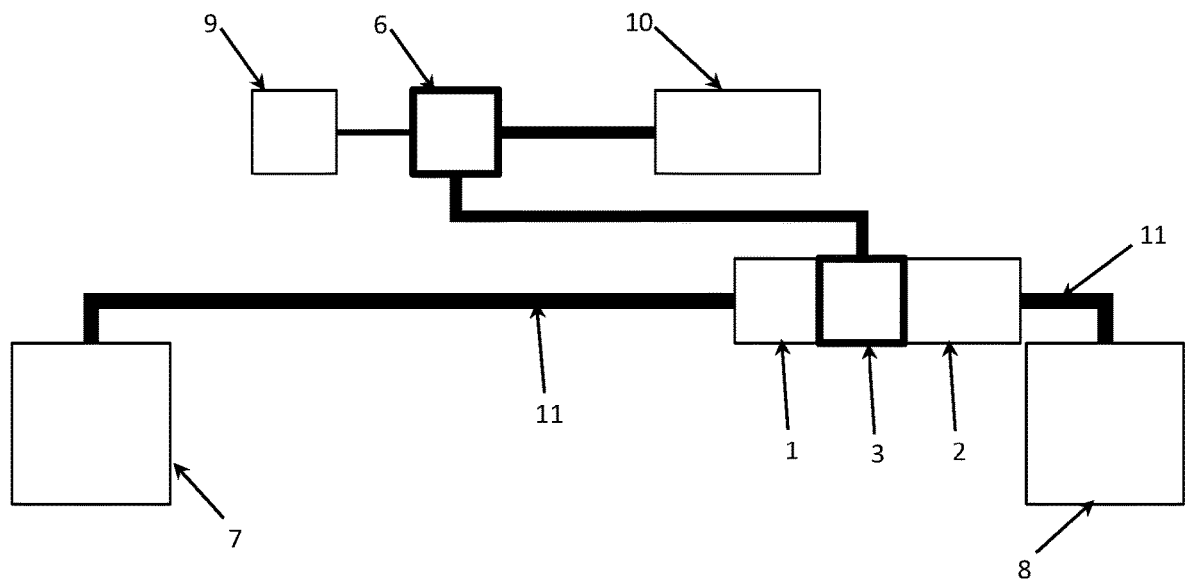
FIG. 3—Schematic of a second embodiment of the heating system.

As can be seen from FIG. 2, the said fuel heating system is equipped with:

at least one electronic command unit 9;

at least one heating control unit 6;

at least one fuel heater 3, which can be inserted inside or outside a fuel rail 1;

at least one fuel injector 2.

Where the rail 1 and injectors 2 are connected by hoses to a fuel pump 7 (represented in FIGS. 1 and 2 integrated into the fuel tank) that pressurizes the fuel line 11, and where there may or may not be downstream and upstream temperature sensors of the fuel heater.

Figure 1:
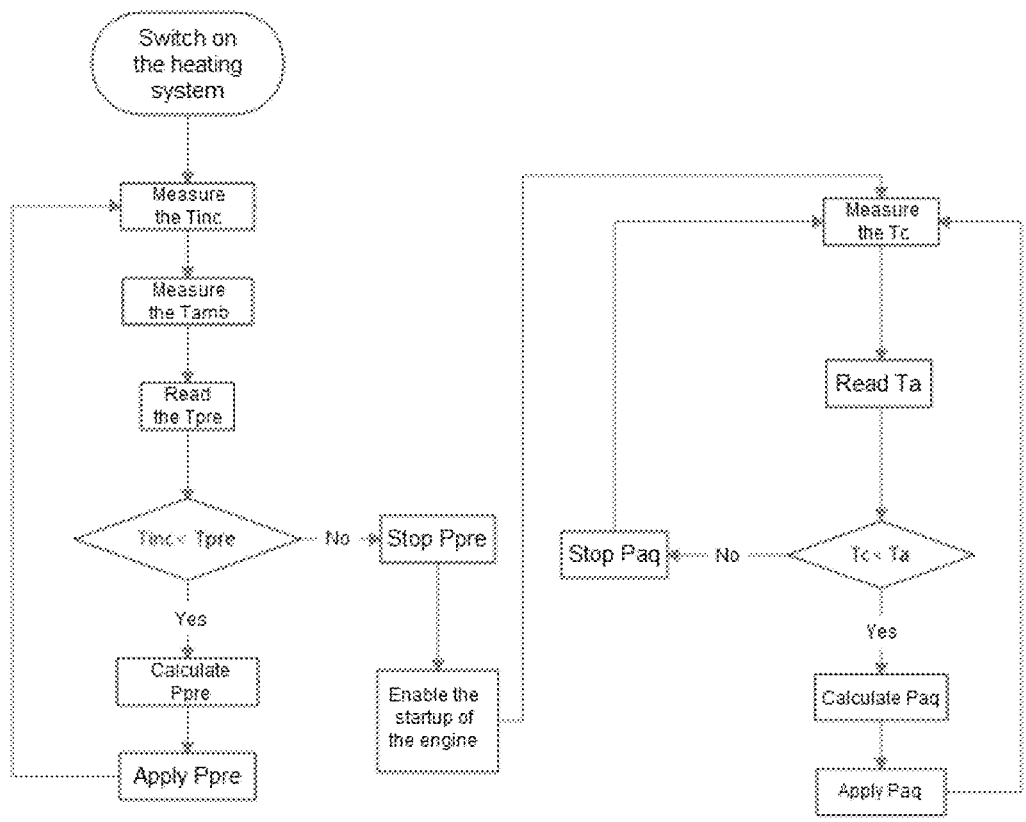
FIG. 1—Diagram of the method of preheating and controlling the temperature of the injected fuel.

As can be seen in FIG. 1, the operation of the heating system occurs from the moment that the preheating of the fuel begins. Preheating is critical for locations where the ambient temperature is extremely low, and can reach several degrees below 0° C. The management of the system is intended to preheat the fuel before the engine starts from an initial fuel temperature $t_{inc}$ to an injected fuel temperature $T_c$, and to keep the fuel temperature $T_c$ constant, so that it is greater than or equal to the target temperature $T_a$. For this purpose, the system determines the amount of energy that must be supplied to the fuel, based on the fuel inlet temperature on the rail 1, the fuel flow rate and the fuel type.

Thus, the present invention describes a method for controlling the temperature of fuel injected into a combustion engine, which comprises:

an electronic fuel injection control unit in the engine;

at least one fuel-heating device 3 arranged in contact with the fuel;

at least one fuel-heating control unit 6 connected by means of at least one data connection to the electronic injection control unit, and electrically connected to at least one fuel-heater, where the fuel-heating control unit controls the operation of at least one fuel heater;

where the said method, and object of the present invention, comprises the steps of:

turning on the heating system;

measuring an initial temperature of the fuel $t_{inc}$ upstream of the heater 3;

measuring an ambient temperature $t_{amb}$;

reading a target temperature of the pre-heated fuel $t_{pre}$ downstream of the heater;

comparing the initial temperature of the fuel $t_{inc}$ upstream of the heater with the target temperature $t_{pre}$ of the pre-heated fuel;

calculating a preheating power $p_{pre}$ necessary to be applied in the heater 3;

applying a preheating power $p_{pre}$ calculated in the heater 3 controlled by the heating control unit;

comparing the temperature of the fuel $t_c$ downstream of the heater with the target temperature $t_{pre}$ of the pre-heated fuel;

enabling the startup of the engine 8 when the fuel temperature condition $t_c$ is greater than or equal to the target temperature $t_{pre}$ of the preheated fuel;

measuring a temperature of the fuel $t_c$ downstream of the heater 3;

reading a target temperature of the fuel $t_a$ downstream of the previously cited heater 3;

comparing the temperature of the fuel $t_c$ downstream of the heater with the target temperature $t_a$ downstream of the heater;

calculating a power $p_{aq}$ necessary to be used in the heater 3;

applying a power $P_{aq}$ calculated in the heater 3 controlled by the heating control unit 6.

The ambient temperature can be measured by means of an ambient temperature sensor, or it can also be obtained by measuring the temperature of the air or the engine water. Another important factor is that the startup of the engine is not enabled while the temperature of the fuel $t_c$ is not greater than or equal to the preheating target temperature $T_{pre}$. When this temperature condition $T_c$ is met, then the startup of the engine is enabled.

The heating system, equipped with the heater 3 and heating control unit 6, does not heat the fuel when the temperature upstream of the heater is equal to or greater than the target temperature $T_a$. For example, during the operation of the engine 8, after a long period of use, it heats up and begins to heat the components around it. The temperature of the engine 8 can be such that it causes the inlet fuel to heat up to the target temperature $T_a$ without the need to start the fuel heater 3. In this case, the heater 3 is switched off to save energy, as the heating of the fuel by the heaters 3 is no longer needed.

As for the preheating target temperature $T_{pre}$ and the target temperature $T_a$ of the heating of the fuel, they may coincide, there being no need for them to be equal.

Figure 4:
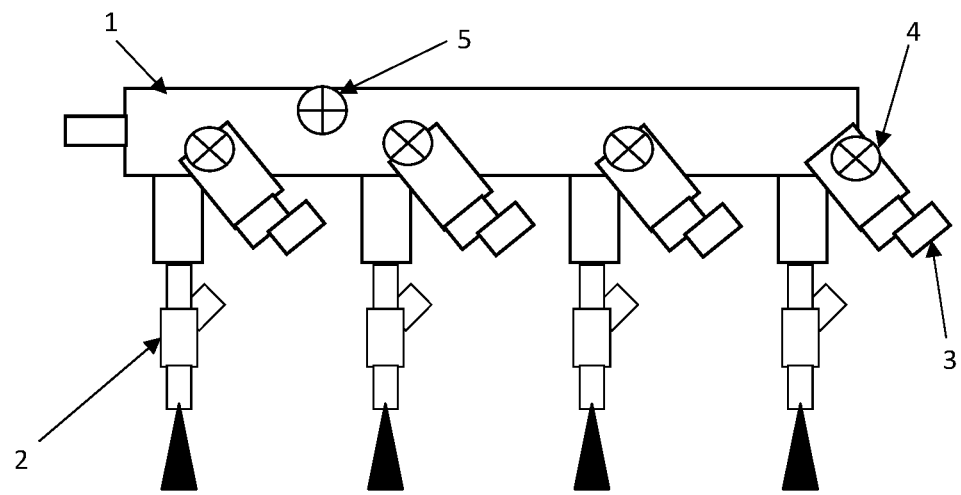
FIG. 4—Details of a configuration of the heating system with a master temperature sensor.
Figure 5:
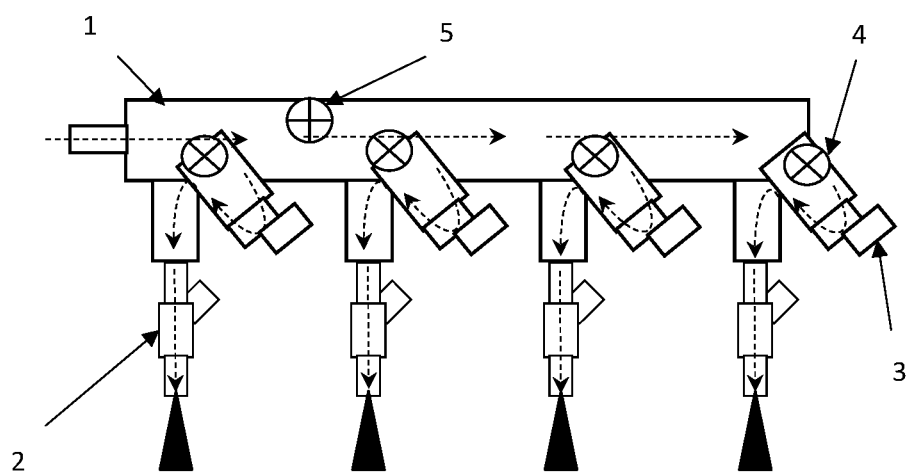
FIG. 5—Details of a second configuration of the heating system with individual temperature sensors.

A fundamental aspect of this invention, in order for the reduction in emissions of pollutants to be fully achieved, is the temperature of the injected fuel $T_c$. The temperature of the fuel $T_c$ downstream of the heater 3 must be known. To know the temperature of the injected fuel $T_c$, a temperature sensor 4 can be placed at the outlet of the fuel rail 1 or in the injector 2. A sensor 4 can be positioned at each outlet (for each injector 2) as shown in FIG. 5, or an outlet can be used as a master (this will be the reference of the fuel temperature $T_c$ for all the injectors, regardless of the number of cylinders), as shown in FIG. 4. When using a sensor 4 for each injector 2, the power applied $P_{aq}$ to all the heaters 3 will be such that the target temperature $T_a$ is obtained equally downstream of each heater 3, regardless of a possible imbalance between the resistances of each heater 3.

In another embodiment of the system, no temperature sensor is used in the heating system. In this case, the temperature of the injected fuel $T_c$ is calculated using a temperature model inserted in the vehicle's electronic control unit 9 or in the control unit of the heaters 6. This model collects other information from the vehicle to discover what temperature the fuel was heated to.

In addition to this, the temperature of the fuel at the entrance to the rail upstream of the heater $T_{cm}$ is another important aspect of the present invention. The temperature of the fuel upstream of the heater $T_{cm}$ must be known. To determine the initial temperature of the fuel to be heated, you can place a fuel temperature sensor anywhere on the fuel line, between the fuel tank 8 and the heater 3. However, the closer it is to the heater 3, the more accurate the temperature measurement will be.

In an alternative embodiment of the system, no temperature sensor is used to measure the temperature upstream of the heater 3. In this case, the temperature of the fuel $T_{cm}$ upstream of the heater 3 is calculated based on other temperature sensors available in the engine, such as the cooling water temperature sensor of the engine (not shown in the figures), or the inlet air temperature sensor of the engine (also not shown), or the oil temperature sensor of the engine (where available).

Some variables that influence the proposed method are already known, and are calculated using the electronic control unit of the vehicle 9, such as the fuel flow rate through the rail 1 and the type of fuel.

In some dynamic conditions, both a sudden acceleration and a severe deceleration can be requested by the driver. In these situations, there is a great variation in the acceleration pedal, detected by the engine management system. So, the engine management system can predict whether the engine will require more or less fuel mass. Thus, it anticipates the injection of a greater or lesser volume of fuel to enable the acceleration or deceleration based on a predetermined fuel volume for that engine speed transition. So, using this same concept, the fuel management system can anticipate the heating of the fuel. In this case, a pre-targeting, or early storage, of power $P_{aq}$ for fuel heating can be determined in the electronic control unit 9, anticipating the fuel heating, so that the temperature of the fuel $T_c$ remains at the target temperature $T_a$, even with a sharp variation in the fuel flow rate.

Thus, during abrupt acceleration changes, there are no changes in the temperature of the fuel $T_c$, since the heating control system has already heated the fuel previously. In addition to this, the heating of the fuel in these dynamic maneuvers also produces a reduction in pollutants, as such maneuvers serve to increase the total level of emissions emitted by the vehicle.

What is claimed is:

1. A method of preheating and controlling a temperature of fuel injected into a combustion engine (8), the combustion engine (8) comprising:
   an engine control unit (9) in the combustion engine (8),
   at least one fuel-heating device (3) positioned in contact with fuel;
   at least one fuel-heating control unit (6) connected by means of at least one data connection to the engine control unit (9), and the at least one fuel-heating control unit (6) electrically connected to the at least one fuel-heating device (3), where the at least one fuel-heating control unit (6) controls operation of the at least one fuel-heating device (3);
   the method comprising the successive steps of:
   turning on the heating system;
   measuring an initial temperature of the fuel ($t_{inc}$) upstream of the at least one fuel-heating device (3) with a first sensor;
   measuring an ambient temperature ($t_{amb}$) with a second sensor;
   reading a target temperature of pre-heated fuel ($t_{pre}$) downstream of the at least one fuel-heating device (3);
   comparing, via the engine control unit (9), the initial temperature of the fuel ($t_{inc}$) upstream of the at least one fuel-heating device (3) with the target temperature ($t_{pre}$) of the pre-heated fuel;
   calculating, via the engine control unit (9), a preheating power ($p_{pre}$) required to be applied to the at least one fuel-heating device (3) so that the at least one fuel-heating device (3) heats the fuel to the target temperature ($t_{pre}$);
   applying the preheating power ($p_{pre}$) to the at least one fuel-heating device (3), the application of the preheating power ($p_{pre}$) being controlled by the at least one fuel-heating control unit (6);
   measuring a temperature of the fuel (tc) downstream of the at least one fuel-heating device (3) with a third sensor;
   comparing, via the engine control unit (9), the temperature of the fuel ($t_c$) downstream of the at least one fuel-heating device (3) with the target temperature ($t_{pre}$) of the pre-heated fuel;
   enabling, via the engine control unit (9), the startup of the combustion engine (8) when the temperature of the fuel ($t_c$) downstream of the at least one fuel-heating device (3) is greater than or equal to the target temperature of the preheated fuel ($t_{pre}$), the startup of the combustion engine (8) having been initially disabled;
   reading a target temperature of the fuel (ta) downstream of the at least one fuel-heating device (3);
   comparing, via the engine control unit (9), the temperature of the fuel ($t_c$) downstream of the at least one fuel-heating device (3) with the target temperature of the fuel ($t_a$) downstream of the at least one fuel-heating device (3);
   calculating, via the engine control unit (9), a power ($p_{aq}$) necessary to be used in the at least one fuel-heating device (3);
   applying the power ($P_{aq}$) to the at least one fuel-heating device (3) controlled by the at least one fuel-heating control unit (6); and
   comparing, via the engine control unit (9), the temperature of the fuel ($T_c$) downstream of the at least one fuel-heating device (3) with the target temperature of the fuel ($T_a$), and
   thereby (i) providing preheated fuel prior to enabling the startup of the combustion engine (8) and thereafter (ii) providing comparison of the temperature of the fuel (Tc) to the target temperature of the fuel (Ta).

2. The method of claim 1, wherein an interruption of the application of power ($P_{aq}$) in the at least one fuel-heating device (3) occurs when, as calculated by the engine control unit (9), the temperature of the fuel ($T_c$) downstream of the at least one fuel-heating device (3) is greater than the target temperature of the fuel ($T_a$).

3. The method of claim 1, wherein an interruption of the application of power ($P_{aq}$) in the at least one fuel-heating device (3) occurs when, as calculated by the engine control unit (9), the temperature of the fuel ($T_c$) downstream of the at least one fuel-heating device (3) is equal to the target temperature of the fuel ($T_a$).

4. The method of claim 1, wherein the temperature of the fuel ($T_c$) downstream of the at least one fuel-heating device (3) is processed by the engine control unit (9).

5. The method of claim 1, wherein the temperature of the fuel ($T_c$) downstream of the at least one fuel-heating device (3) is processed via the at least one fuel-heating control unit (6).

6. The method of claim 1, wherein the method further comprises calculating via the engine control unit (9) an anticipated power for the heating of the fuel ($P_{aq}$).

* * * * *